US010813067B2

(12) United States Patent
Li et al.

(10) Patent No.: US 10,813,067 B2
(45) Date of Patent: Oct. 20, 2020

(54) METHOD AND APPARATUS FOR COORDINATING RESOURCES

(71) Applicant: TELEFONAKTIEBOLAGET LM ERICSSON (PUBL), Stockholm (SE)

(72) Inventors: Gen Li, Beijing (CN); Cong Shi, Beijing (CN); Jonas Kronander, Knivsta (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 173 days.

(21) Appl. No.: 15/738,560

(22) PCT Filed: Jun. 24, 2015

(86) PCT No.: PCT/CN2015/082185
§ 371 (c)(1),
(2) Date: Dec. 20, 2017

(87) PCT Pub. No.: WO2016/206011
PCT Pub. Date: Dec. 29, 2016

(65) Prior Publication Data
US 2018/0192389 A1 Jul. 5, 2018

(51) Int. Cl.
*H04W 56/00* (2009.01)
*H04W 16/14* (2009.01)

(52) U.S. Cl.
CPC ....... *H04W 56/0015* (2013.01); *H04W 16/14* (2013.01); *H04W 56/00* (2013.01)

(58) Field of Classification Search
CPC . H04W 56/0015; H04W 16/14; H04W 56/00; H04W 72/082
(Continued)

(56) References Cited

U.S. PATENT DOCUMENTS 9,655,132 B2 5/2017 Caretti et al.
2009/0245197 A1* 10/2009 Ma .................. H04L 5/0046
370/330

(Continued)

FOREIGN PATENT DOCUMENTS

| CN | 101854645 A1 | 10/2010 |
| CN | 104620648 A | 5/2015 |
| WO | 2011095211 A1 | 8/2011 |

OTHER PUBLICATIONS

International Preliminary Report on Patentability, issued in corresponding International Application No. PCT/CN2015/082185, dated Dec. 26, 2017, 8 pages.

(Continued)

*Primary Examiner* — Kwang B Yao
*Assistant Examiner* — Syed M Bokhari
(74) *Attorney, Agent, or Firm* — Patent Portfolio Builders, PLLC

(57) ABSTRACT

A method for coordinating resources among a plurality of operating networks, including a first operating network and a second operating network performed at a coordination node, which may be a distributed coordination node in the first operating network or a centralized coordination node. The method comprises obtaining a first resource pattern for the first operating network and a second resource pattern for the second operating network. The first resource pattern is coordinated with the second resource pattern such that the first and second operating networks can conduct communications on different resource blocks when the first operating network is synchronized with the second operating network. The method also comprises determining whether the first operating network is synchronized with the second operating network. If it is determined that the first operating network is not synchronized with the second operating network, the method further comprises adjusting at least the first resource pattern.

15 Claims, 15 Drawing Sheets

(58) Field of Classification Search
USPC .................................. 370/350, 330, 329, 328
See application file for complete search history.

(56) References Cited

U.S. PATENT DOCUMENTS

| | | | | |
|---|---|---|---|---|
| 2011/0158164 A1* | 6/2011 | Palanki | ............. | H04W 72/0413 |
| | | | | 370/328 |
| 2011/0256833 A1* | 10/2011 | Racz | .................... | H04W 24/08 |
| | | | | 455/63.1 |
| 2011/0261769 A1* | 10/2011 | Ji | ......................... | H04L 5/0007 |
| | | | | 370/329 |
| 2014/0112260 A1* | 4/2014 | Sorrentino | .......... | H04W 52/325 |
| | | | | 370/329 |
| 2014/0301353 A1* | 10/2014 | Frenne | .................... | H04L 5/003 |
| | | | | 370/330 |
| 2015/0063294 A1* | 3/2015 | Noh | .................... | H04B 7/0413 |
| | | | | 370/330 |

OTHER PUBLICATIONS

International Search Report and Written Opinion dated Mar. 11, 2016, in International Application No. PCT/CN2015/082185, 15 pages.

\* cited by examiner (a)

(b)

(a)

(b)

(a)

(b)

METHOD AND APPARATUS FOR COORDINATING RESOURCES

CROSS REFERENCE TO RELATED APPLICATION(S)

This application is a 35 U.S.C. § 371 National Phase Entry Application from PCT/CN2015/082185, filed Jun. 24, 2015, designating the United States, the disclosure of which is incorporated herein in its entirety by reference.

TECHNICAL FIELD

The non-limiting and exemplary embodiments of the present disclosure generally relate to the technical field of wireless communications, and specifically to a method and apparatus for coordinating resources among different operating networks, particularly when these operating networks are unsynchronized.

BACKGROUND

This section introduces aspects that may facilitate better understanding of the disclosure. Accordingly, the statements of this section are to be read in this light and are not to be understood as admissions about what is in the prior art or what is not in the prior art.

Currently, in addition to the licensed (exclusive) spectrum, the shared spectrum (e.g. unlicensed or Licensed Shared Access, LSA) becomes more and more promising as a complementary way of authorizing and accessing the spectrum in the fourth generation (4G) and future generation (e.g. the fifth generation, 5G) systems, e.g. the licensed assisted access 5 GHz unlicensed spectrum. Due to coexistence with other systems, such as a Wireless Fidelity (WiFi), an important character for the unlicensed or LSA spectrum is that multiple operators are operating on the same carrier. For spectrum sharing operators, a key problem is inter-network interference, especially when these networks are not synchronized.

In the existing solutions as proposed in Patent Cooperation Treaty (PCT) patent applications No. PCT/CN2014/070999 and No. PCT/CN2014/070997, the inter-network interference of spectrum sharing operators is handled by the link-specific coordination concepts. The key idea of these concepts is that a link involved in the interference will be assigned a coordinated resource pattern on a frame basis, in which some parts of resources are only allowed to be scheduled to that link in order to eliminate the interference.

Particularly, the solution as proposed in the PCT patent application No. PCT/CN2014/070999 discloses a centralized inter-network interference coordination method, especially for ultra-dense networks (UDNs), to enable better spectrum sharing between different networks. Its basic concept is to introduce a centralized functional entity to collect link-specific interference information and determine the coordination context, i.e. a fraction of resources that can be scheduled for the considered link, for each link to avoid inter-network interference exceeding a given threshold.

The solution as proposed in the PCT patent application No. PCT/CN2014/070997 discloses a distributed inter-network interference coordination method, especially for UDNs, to enable better spectrum sharing between different networks. Different from the solution in PCT/CN2014/070999, there is a resource coordination entity for each network, and the coordination information is exchanged between two independent resource coordination entities, rather than being aggregated in a centralized functional entity. Each network collects link-specific interference information and based on the exchanged coordination information to determine the coordination context, i.e. a fraction of resources that can be scheduled for the considered link, for each link to avoid inter-network interference exceeding a given threshold.

Another solution proposed in the PCT patent application No. PCT/CN2014/084640 also discloses a distributed inter-network interference coordination method, especially for millimeter wave (MMW) networks, to enable better spectrum sharing between different networks. This solution is different from the above two solutions in that only a blanking pattern for each network instead of a coordination context for multiple link pairs is exchanged, which advantageously reduce the signaling overhead.

However, all the existing coordination methods assume that the networks operated by different operators should be perfectly synchronized so that resource patterns for different operators can be aligned and thus inter-network interference can be eliminated as expected. Unfortunately, in real systems, it is difficult to guarantee that different operators' networks are perfectly synchronized. As such, the existing coordination solutions cannot be implemented as it is to achieve the desired interference elimination effect. FIG. 1 explains the interference problem of the existing coordination solutions in an unsynchronized scenario. Taking two operators A and B as example, FIG. 1(a) and FIG. 1(b) show resource scheduling sequences of two networks operated by operators A and B in synchronization and out of synchronization in time domain, respectively. The resource patterns coordinated for operators A and B on an assumption of synchronization are shown in the upper part of each figure in which the dotted block represents schedulable resources for the corresponding operator, while the white part represents those resources not permitted to be scheduled. In the synchronized case as shown in FIG. 1(a), the two operators schedule respective resources according to their corresponding coordinated resource patterns and interference could be effectively cancelled as expected. However, in the unsynchronized case as shown in FIG. 1(b), if the two operators still schedule resources according to the coordinated resource patterns based on the synchronization assumption, there may exit some parts within dashed line zones where severe interference may occur with each other.

Likewise, if different networks sharing the same spectrum are not synchronized in frequency domain, there may also be severe interference in some parts as illustrated in FIG. 2, when resources are scheduled according to the resource patterns coordinated based on the synchronization assumption.

SUMMARY

Various embodiments of the disclosure aim at providing an effective solution to the interference problem that may persist even though coordinated resource patterns are applied. Other features and advantages of embodiments of the disclosure will also be understood from the following description of specific embodiments when read in conjunction with the accompanying drawings, which illustrate the principles of embodiments of the present disclosure.

In a first aspect of the present disclosure, there is provided a method for coordinating resources among a plurality of operating networks, including a first operating network and a second operating network. The method is performed at a coordination node, which may be a distributed coordination node in the first operating network or a centralized coordination node. The method comprises obtaining a first resource pattern for the first operating network and a second resource pattern for the second operating network. The first resource pattern is coordinated with the second resource pattern such that the first and second operating networks can conduct communications on different resource blocks when the first operating network is synchronized with the second operating network. The method also comprises determining whether the first operating network is synchronized with the second operating network. If it is determined that the first operating network is not synchronized with the second operating network, the method further comprises adjusting at least the first resource pattern such that the first and second operating networks can conduct communications on different resource blocks.

By virtue of this method, resource patterns coordinated between different operating networks on an assumption that those networks are synchronized can be adjusted according to synchronization conditions, such that possible interference caused by unsynchronization can be avoided.

In an embodiment of the distributed coordination node, the method may further comprise notifying the second operating network of at least the adjusted first resource pattern.

In another embodiment of the centralized coordination node, the method may further comprise notifying at least the first operating network and the second operating network of at least the adjusted first resource pattern. In such embodiment, the plurality of operating networks is communicatively connected to the centralized coordination node.

In this way, each operating network can obtain knowledge of the updated resource patterns in a good time so as to enable adaption of its resource scheduling accordingly, thereby timely avoiding occurrence of interference caused by unsynchronization.

In a further embodiment, the method may also comprise negotiating with the second operating network regarding which operating network will adjust the corresponding resource pattern. By means of this negotiation, a potential interference problem due to simultaneous adjustment of the resource patterns in both the first and second operating networks can be avoided.

In yet another embodiment, whether the first operating network is synchronized with the second operating network may be determined by calculating at least one offset for the first operating network and the second operating network based on a measurement report from a terminal device in the first operating network and/or a terminal device in the second operating network. In this way, the existing measurement reporting mechanism can be effectively reused so that the proposed method can be easily applied to the existing systems.

In yet another embodiment, if the at least one offset indicates that first timing of the first operating network is later than second timing of the second operating network, then resource blocks on the earliest side of the first resource pattern corresponding to a time difference between the first timing and the second timing may be moved to the latest side of the first resource pattern. In this embodiment, if the at least one offset indicates that the first timing is earlier than the second timing, then the resource blocks on the latest side of the first resource pattern corresponding to the time difference between the first timing and the second timing may be moved to the earliest side of the first resource pattern.

In yet another embodiment, if the at least one offset indicates that a first central frequency used for the first operating network is lower than a second central frequency used for the second operating network, then resource blocks on the highest frequency side of the first resource pattern corresponding to a frequency difference between the first central frequency and the second central frequency may be moved to the lowest frequency side of the first resource pattern. In this embodiment, if the at least one offset indicates that the first central frequency is higher than the second central frequency, then resource blocks on the lowest frequency side of the first resource pattern corresponding to a frequency difference between the first central frequency and the second central frequency may be moved to the highest frequency side of the first resource pattern.

By virtue of the above two embodiments, resource patterns can be adjusted according to actual unsynchronization conditions in time domain and/or in frequency domain so that the adjustment can be selectively applied to the resource patterns when needed. In this way, on one hand, if severe un-synchronization happens in both time domain and frequency domain, a comprehensive adjustment can be applied so that any interference caused by un-synchronization in both time domain and frequency domain can be avoided; on the other hand, if un-synchronization happens only in one domain, no adjustment will be carried out in the other domain so as to improve efficiency of the adjustment.

In yet another embodiment, the first resource pattern and the second resource pattern may comprise a guard period for eliminating an influence of time shifting. In this way, the influence of time shifting, e.g. caused by clock shifting, can be eliminated.

In a second aspect of the present disclosure, there is provided an apparatus for coordinating resources among a plurality of operating networks, including a first operating network and a second operating network. The apparatus is embodied at a coordination node, which may be a distributed coordination node in the first operating network or a centralized coordination node. The apparatus comprise an obtaining unit, a determining unit, and an adjusting unit. The obtaining unit is configured to obtain a first resource pattern for the first operating network and a second resource pattern for the second operating network. The first resource pattern is coordinated with the second resource pattern such that the first and second operating networks can conduct communications on different resource blocks when the first operating network is synchronized with the second operating network. The determining unit is configured to determine whether the first operating network is synchronized with the second operating network. The adjusting unit is configured to adjust at least the first resource pattern such that the first and second operating networks can conduct communications on different resource blocks, if the first operating network is not synchronized with the second operating network.

In an embodiment that the apparatus embodied at the distributed coordination node, the apparatus may further comprise a notifying unit that is configured to notify the second operating network of at least the adjusted first resource pattern.

In another embodiment that the apparatus embodied at the distributed coordination node, the apparatus may further comprise a negotiating unit that is configured to negotiate with the second operating network regarding which operating network will adjust the corresponding resource pattern.

In yet another embodiment that the apparatus embodied at the centralized coordination node, the apparatus may further comprise a notifying unit that is configured to notify at least the first operating network and the second operating network of at least the adjusted first resource pattern. In this embodiment, the plurality of operating networks may be communicatively connected to the centralized coordination node.

In yet another embodiment, the determining unit may be further configured to determine whether the first operating network is synchronized with the second operating network by calculating at least one offset for the first operating network and the second operating network based on a measurement report from a terminal device in the first operating network and/or a terminal device in the second operating network.

In yet another embodiment, the adjusting unit may be configured to, if the at least one offset indicates that first timing of the first operating network is later than second timing of the second operating network, then move resource blocks on the earliest side of the first resource pattern corresponding to a time difference between the first timing and the second timing to the latest side of the first resource pattern. In this embodiment, the adjusting unit may be further configured to, if the at least one offset indicates that the first timing is earlier than the second timing, then move the resource blocks on the latest side of the first resource pattern corresponding to the time difference between the first timing and the second timing to the earliest side of the first resource pattern.

In yet another embodiment, the adjusting unit may be configured to, if the at least one offset indicates that a first central frequency used for the first operating network is lower than a second central frequency used for the second operating network, then move resource blocks on the highest frequency side of the first resource pattern corresponding to a frequency difference between the first central frequency and the second central frequency to the lowest frequency side of the first resource pattern. In this embodiment, the adjusting unit may be further configured to, if the at least one offset indicates that the first central frequency is higher than the second central frequency, then move resource blocks on the lowest frequency side of the first resource pattern corresponding to a frequency difference between the first central frequency and the second central frequency to the highest frequency side of the first resource pattern.

In a further embodiment, the first resource pattern and the second resource pattern may comprise a guard period for eliminating an influence of time shifting.

In a third aspect of the present disclosure, there is provided a method for facilitating coordination of resources among a plurality of operating networks. The method is performed at a base station in an operating network included in the plurality of operating networks. The method comprises instructing a terminal device in the operating network to measure synchronization conditions of one or more operating networks of the plurality of operating networks and then receiving a report of the measured synchronization conditions of the one or more operating networks from the terminal device. The method further comprises transmitting information on the measured synchronization conditions to a coordination node that coordinates the resources among the plurality of operating networks based at least on the information.

In a fourth aspect of the present disclosure, there is provided a method for facilitating coordination of resources among a plurality of operating networks. The method is performed at a terminal device in an operating network included in the plurality of operating networks. The method comprises receiving an instruction from a base station in the operating network to measure synchronization conditions of one or more operating networks of the plurality of operating networks and accordingly measuring the synchronization conditions of the one or more operating networks in response to the instruction. The method also comprises reporting the measured synchronization conditions to the base station for transmission to a coordination node that coordinates the resources among the plurality of operating networks based at least on information on the synchronization conditions.

In a fifth aspect of the present disclosure, there is provided an apparatus for coordinating resources among a plurality of operating networks. The apparatus is embodied at a coordination node and comprises a processor and a memory. The memory contains instructions executable by the processor, whereby the apparatus is operative to perform the method according to the first aspect of the present disclosure.

In a sixth aspect of the present disclosure, there is provided an apparatus for coordinating resources among a plurality of operating networks. The apparatus is embodied at a coordination node and comprises processing means adapted to perform the method according to the first aspect of the present disclosure.

In a seventh aspect of the present disclosure, there is provided a computer program product comprising instructions that when executed by a processing unit in a coordination node, causes the coordination node to perform the method according to the first aspect of the present disclosure.

BRIEF DESCRIPTION OF THE DRAWINGS

The above and other aspects, features, and benefits of various embodiments of the disclosure will become more fully apparent from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
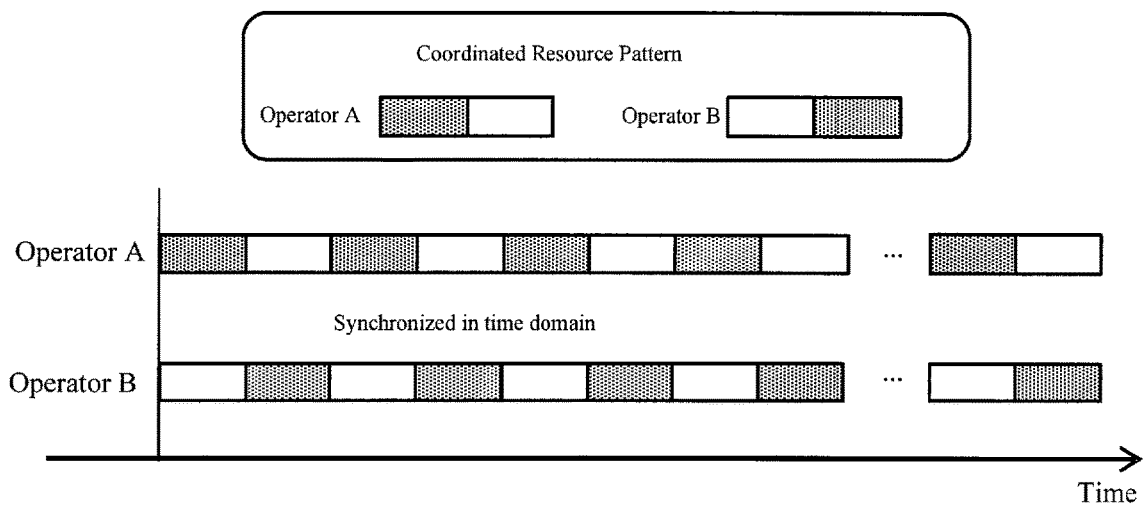
FIG. 1 explains an interference problem of the existing coordination solutions in an unsynchronized scenario.
Figure 1:
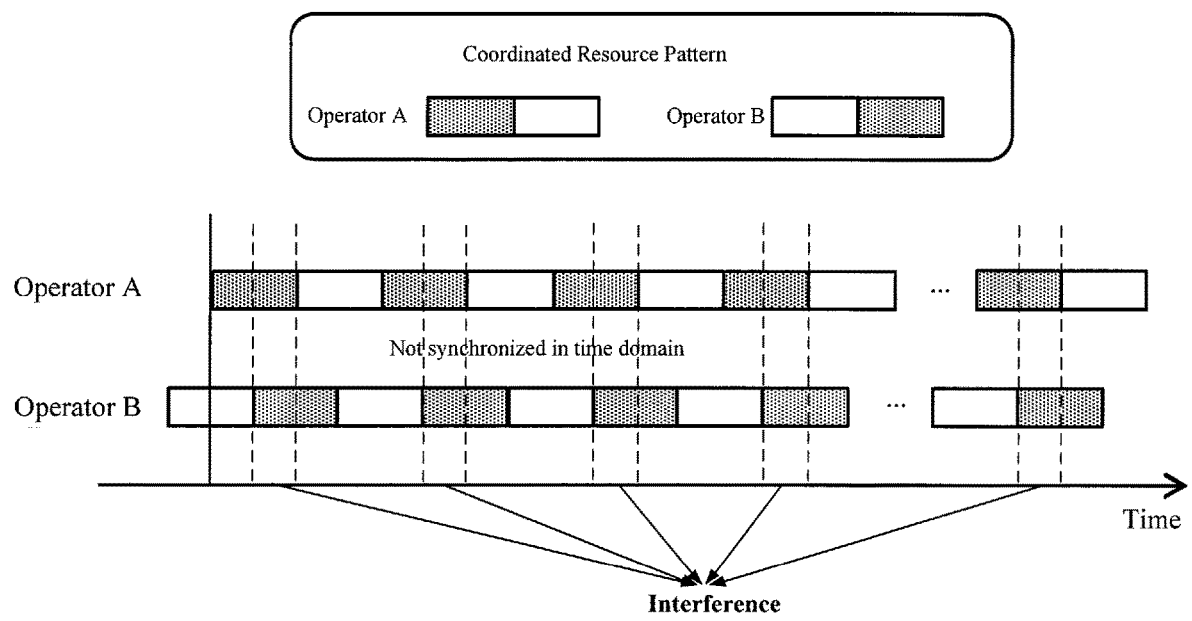
Figure 2:
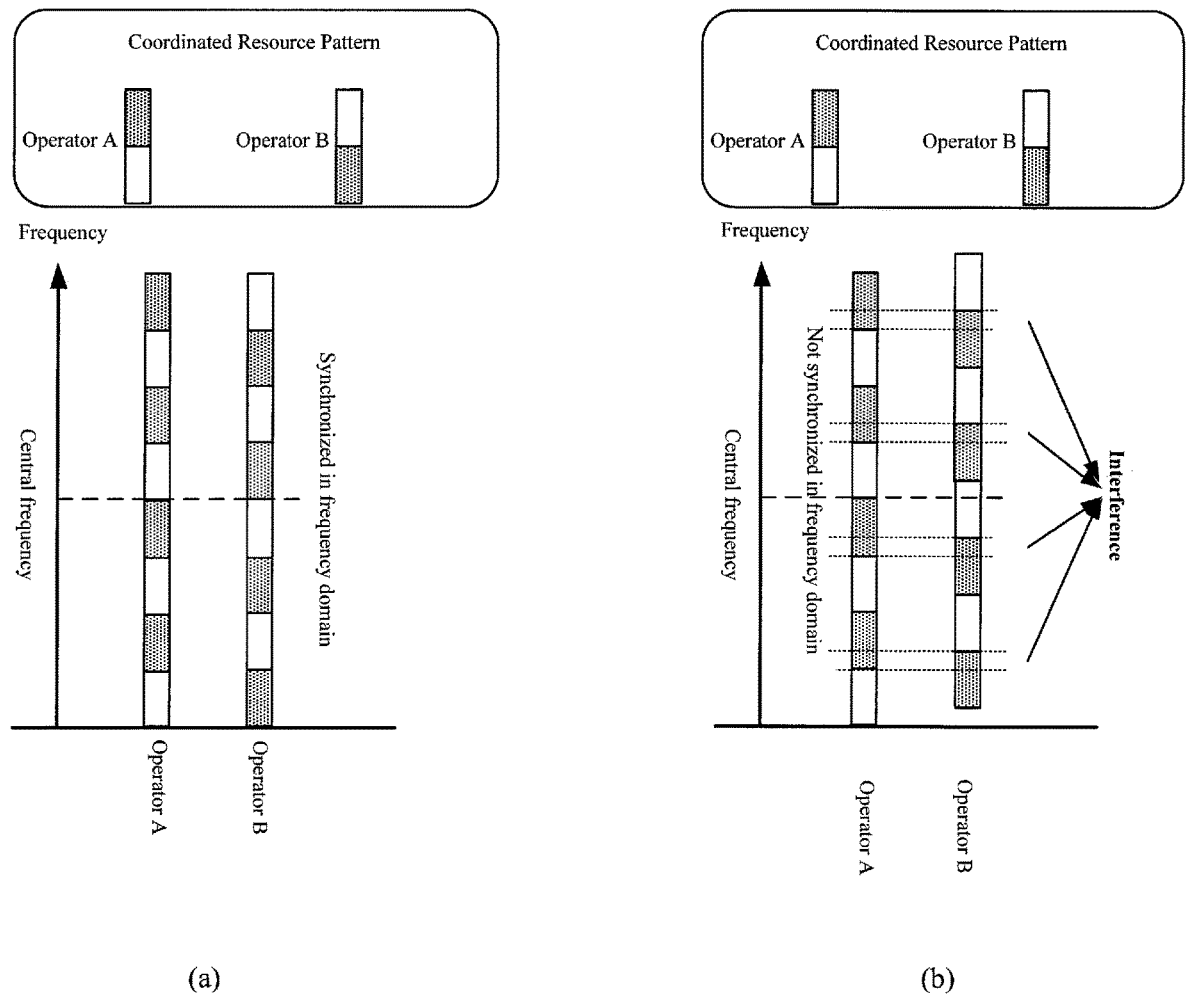
FIG. 2 explains the interference problem of the existing coordination solutions in another unsynchronized scenario.

Hereinafter, the principle and spirit of the present disclosure will be described with reference to the illustrative embodiments. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "an embodiment," "another embodiment," "yet another embodiment," etc., indicate that the embodiment described may include a particular feature, structure, or characteristic, but every embodiment may not necessarily include the particular feature, structure, or characteristic. Moreover, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to limit example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skill in the art to which this disclosure belongs. For example, the term "base station" used herein may refer to e.g. eNB, eNodeB, NodeB, Access Node, Base Transceiver Station (BTS) or Access Point, depending on the technology and terminology used. The term "resource block" used herein may refer to a minimum time-frequency resource unit that can be scheduled. Hereafter, the "resource pattern" used by an operating network may refer to a minimum non-repetitive pattern that indicates schedulable resource blocks, which are allowed to be scheduled by the operating network and blanking resource blocks, which are not allowed to be scheduled by the operating network. In any figure having a resource pattern throughout the drawings, the schedulable resource blocks are represented with dotted blocks and the blanking resource blocks are represented with white blocks.

Figure 3:
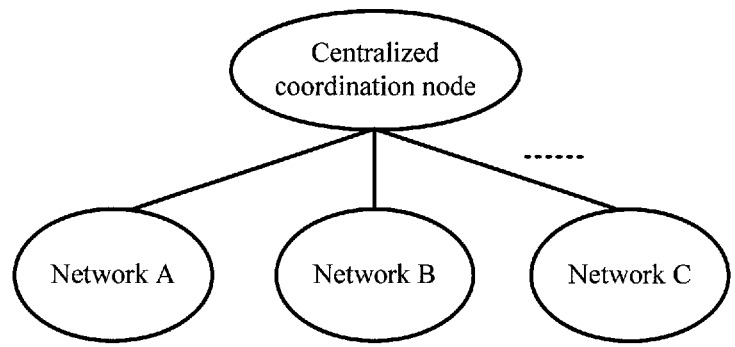
FIG. 3 illustrates two topologies for resource coordination.
Figure 3:
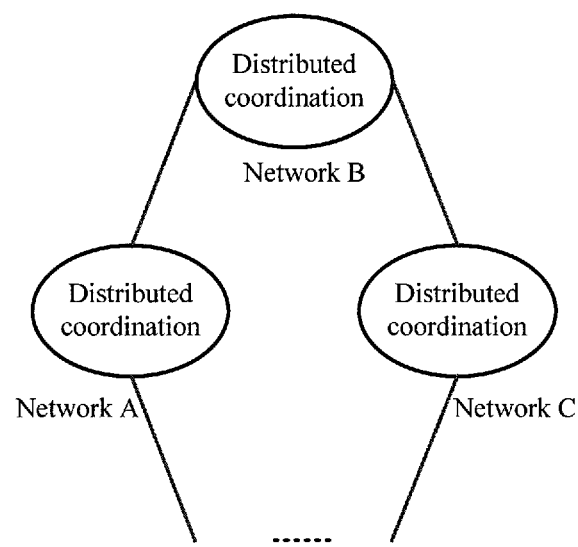

Before the description of embodiments of the present disclosure, two topologies for resource coordination are introduced with reference to FIG. 3, which comprise a centralized coordination topology and a distributed coordination topology.

FIG. 3(a) illustrates a centralized topology, in which information on resource usage of networks A, B and C etc. can be collected by a centralized coordination node, which may then determine, based on the collected information, coordinated resource patterns for respective operating networks among which interference may be caused. FIG. 3(b) illustrates a distributed topology, in which two neighboring networks between which interference may be caused, e.g. networks A and B, may exchange information and negotiate with each other to determine the coordinated resource patterns. The "coordinated" resource patterns imply that no resource block is scheduled simultaneously in these patterns. The coordinated resource patterns are preferably orthogonal.

Figure 4:
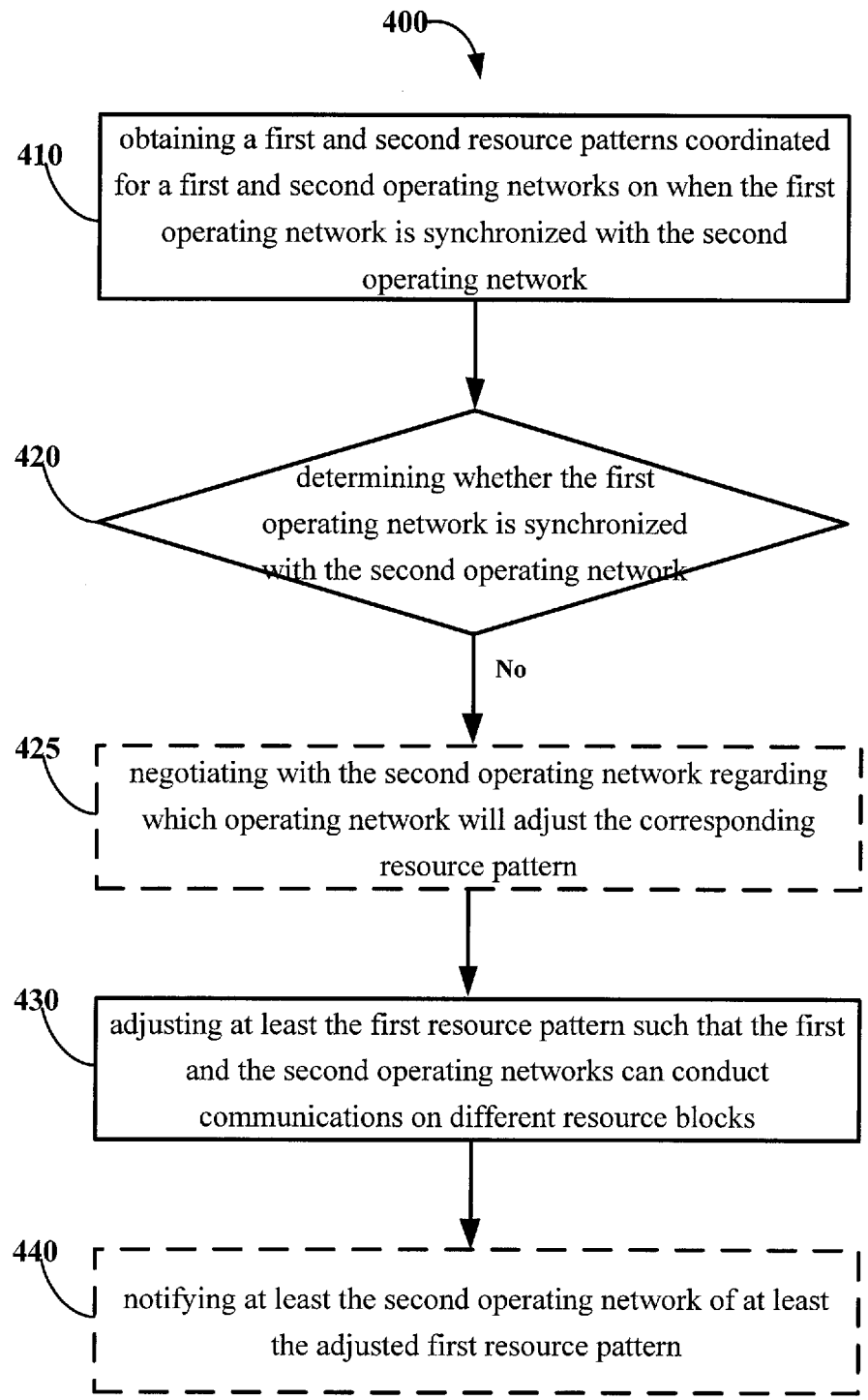
FIG. 4 illustrates a flowchart of a method for coordinating resources among a plurality of operating networks according to an embodiment of the present disclosure.

FIG. 4 illustrates a flowchart of a method 400 for coordinating resources among a plurality of operating networks, e.g. UDN or MMW networks, according to an embodiment of the present disclosure. The method 400 is performed at a coordination node. The plurality of operating networks may be operated by different operators.

The method 400 may be performed in a distributed way at the coordination node that is a distributed coordination node. The distributed coordination node may be located in one of the plurality of operating networks, say a first operating network, and coordinate resources between the first operating network and any other of the plurality of operating networks, say a second operating network, which may communicate information with the distributed coordination node. The distributed coordination node may be embodied as at least a part of a base station of the first operating network or as an independent entity in the first operating network.

The method 400 may alternatively be performed in a centralized way at the coordination node that is a centralized coordination node. The centralized coordination node may be located in one of the plurality of operating networks or outside any of the plurality of operating networks as an independent entity. The centralized coordination node may coordinate resources among the plurality of operating networks, including a first operating network and a second operating network, that are communicatively connected to the centralized coordination node.

Particularly, the method 400 is entered at block 410, in which a first resource pattern for the first operating network and a second resource pattern for the second operating network are obtained at the coordination node. The first resource pattern is coordinated with the second resource pattern such that the first and second operating networks can conduct communications on different resource blocks when the first operating network is synchronized with the second operating network.

In an embodiment that the coordination node is a distributed coordination node, the first and second resource patterns may be obtained through negotiation between the first and second operating networks. Various methods for obtaining the coordinated resource patterns are already known, as described in PCT patent applications No. PCT/CN2014/070997 and PCT/CN2014/084640, and thus will be omitted herein for the purpose of conciseness.

In another embodiment that the coordination node is a centralized coordination node, the first and second resource patterns may be determined or generated by the coordination node, e.g. based on information collected at least from the first and second operating networks. Various methods for obtaining the coordinated resource patterns are already known, as described in PCT patent applications No. PCT/CN2014/070999, and thus will be omitted herein for the purpose of conciseness.

At block 420, it is determined whether the first operating network is synchronized with the second operating network.

In an embodiment, whether the first operating network is synchronized with the second operating network may be determined by calculating at least one offset for the first operating network and the second operating network based on a measurement report from a terminal device in the first operating network and/or a measurement report from a terminal device in the second operating network.

Figure 5:
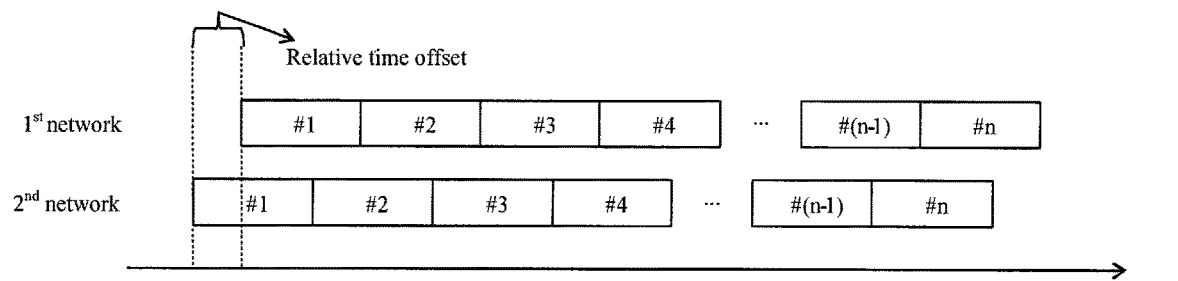
FIG. 5 illustrates examples of different offsets of two operating networks.
Figure 5:
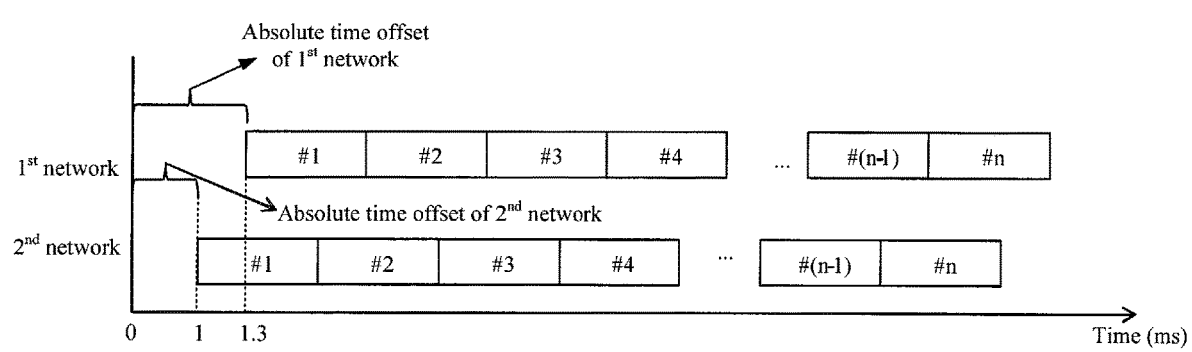

As an example, the at least one offset may be a relative offset between the first and second operating networks. When the relative offset is an offset in time domain, it may be calculated based on a time difference between corresponding time points, e.g. starting or end time points, of a same frame in the first and second networks. FIG. 5(*a*) illustrates an example of a relative offset between two operating networks, i.e. the first and second operating networks. As illustrated, the relative offset of the first operating network with respect to the second operating network is −0.3 ms, which indicates the timing of the first operating network is later than the timing of the second operating network; and the relative offset of the second operating network with respect to the first operating network is 0.3 ms, which indicates the timing of the second operating network is earlier than the timing of the first operating network.

Likewise, when the relative offset is an offset in frequency domain, it may be calculated based on a frequency difference of corresponding frequencies, e.g. preferably central or alternatively starting or end frequencies, of the resource patterns used for the first and second operating networks.

As another example, the at least one offset may comprise an absolute offset for each of the first and second operating networks. When the absolute offset is an offset in time domain, it refers to a time interval between a predefined time point, e.g. starting or end time point, of a frame and a reference time point. FIG. 5(*b*) illustrates an example of absolute offsets of two operating networks, i.e. the first and second operating networks. As illustrated, the absolute offsets of frame #1 in the first and second operating networks with respect to the reference time point 0 are 1.3 ms and 1 ms, respectively.

Likewise, when the absolute offset is an offset in frequency domain, it refers to a frequency gap between a predefined, e.g. preferably central or alternatively starting or end frequencies, of the resource pattern used for the corresponding network and a reference frequency.

Figure 6:
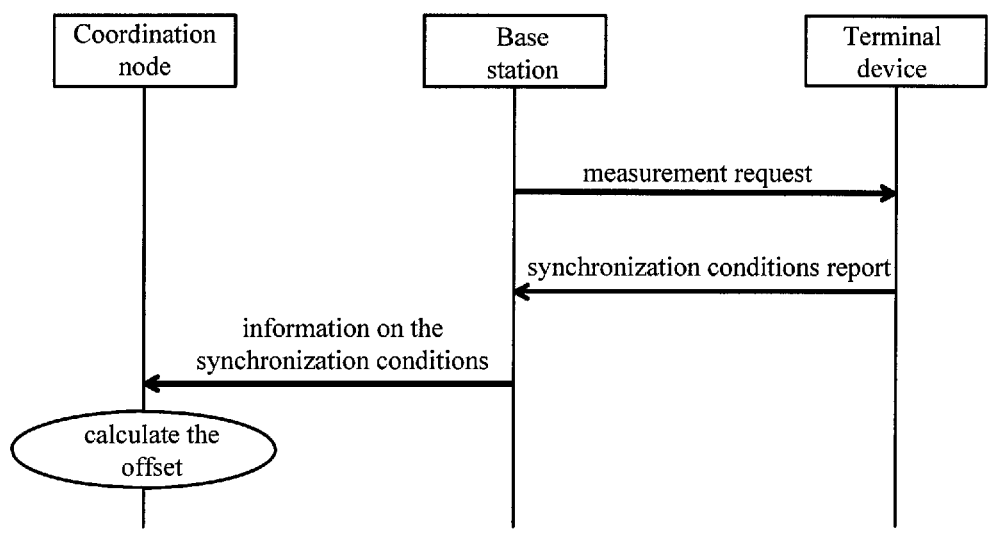
FIG. 6 illustrates a procedure for calculating time and/or frequency offset between different operating networks according to an embodiment of the present disclosure.

In order to calculate the offset(s) for different operating networks, it is needed that a terminal device in one operating network can decode the system information from another operating network to obtain information on clock synchronization and/or frequency synchronization. It may be implemented when the terminal device performs inter-network interference measurement. FIG. 6 illustrates a procedure for calculating time and/or frequency offset for different operating networks according to an embodiment of the present disclosure.

Firstly, a base station of one operating network may instruct a terminal device in that operating network to perform measurement on synchronization conditions by sending a measurement request. The measurement request may include a measurement object, i.e. which operating network(s) the terminal device should measure, a measurement period and a report format and any other information as required.

Then, the terminal device may follow the instruction included in the measurement request sent from the base station to perform measurement on synchronization conditions, which is mainly focused on the synchronization clock and/or the DC subcarrier of the specified one or more operating networks, e.g. by decoding the Primary Synchronization Signal (PSS) and Second Synchronization Signal (SSS) from the one or more operating networks in a long-term evolution (LTE) system. Afterwards, the terminal device will report the measured synchronization conditions, such as the measured synchronization clock and/or the DC subcarrier to the base station.

Then the base station will transmit information on the measured synchronization conditions reported from the terminal device to the coordination node. Based on this information, the coordination node can calculate the time offset and/or the frequency offset for the measured operating networks.

In an embodiment of the distributed coordination node in the first operating network, the time and/or frequency offset for the first operating network and the second operating network may preferably be calculated based on a measurement report from a terminal device in the first operating network. Additionally or alternatively, the measurement results reported from a terminal device in the second operating network may also be transmitted to the distributed coordination node for offset calculation.

In another embodiment of the centralized coordination node, since the centralized coordination node is capable of collecting information from all of the plurality operating networks, the time and/or frequency offset for the first operating network and the second operating network may be calculated based on a measurement report(s) from a terminal device in the first operating network, from a terminal device in the second operating network and/or even from a terminal device in a third operating network.

Now, reference is made back to FIG. 4. If it is determined at block 420 that the first operating network is not synchronized with the second operating network, then at least the first resource pattern is adjusted at block 430 such that the first and the second operating networks can conduct communications on different resource blocks, even when the first and second operating networks are not synchronized.

In an embodiment, if the calculated at least one offset indicates that first timing of the first operating network is later than second timing of the second operating network, then resource blocks on the earliest side of the first resource pattern corresponding to a time difference between the first timing and the second timing may be moved to the latest side of the first resource pattern. Otherwise, if the calculated at least one offset indicates that the first timing is earlier than the second timing, then the resource blocks on the latest side of the first resource pattern corresponding to the time difference between the first timing and the second timing may be moved to the earliest side of the first resource pattern.

Figure 7:
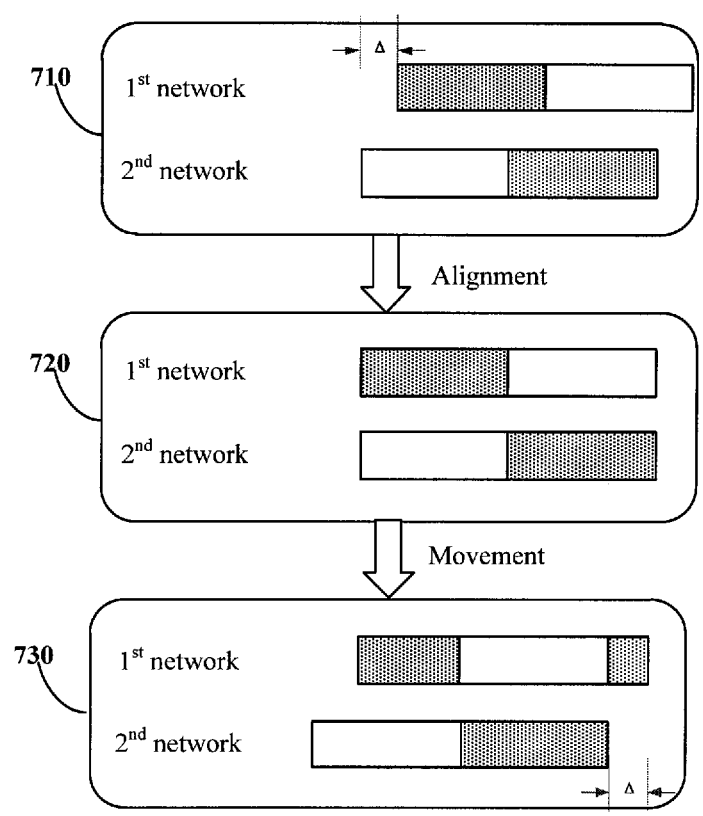
FIG. 7 illustrates an example of how to adjust a resource pattern in time domain according to an embodiment of the present disclosure.

FIG. 7 illustrates an example of how to adjust a resource pattern, e.g. the first resource pattern in time domain, according to an embodiment of the present disclosure.

As illustrated, the resource patterns in block 710 show that the first timing of the first operating network is later than the second timing of the second operating network. Then in block 720, the two resource patterns are aligned. Accordingly, in block 730, resource blocks on the earliest side (i.e. at the left end as shown) of the first resource pattern corresponding to the time difference A between the first and second timing are moved to the latest side (i.e. the right end as shown) of the first resource pattern. The resource patterns in block 730 will be applied to the first and second operating networks.

In another embodiment, if the calculated at least one offset indicates that a first central frequency used for the first operating network is lower than a second central frequency used for the second operating network, then resource blocks on the highest frequency side of the first resource pattern corresponding to a frequency difference between the first central frequency and the second central frequency may be moved to the lowest frequency side of the first resource pattern. Otherwise, if the calculated at least one offset indicates that the first central frequency is higher than the second central frequency, then resource blocks on the lowest frequency side of the first resource pattern corresponding to a frequency difference between the first central frequency and the second central frequency may be moved to the highest frequency side of the first resource pattern.

Figure 8:
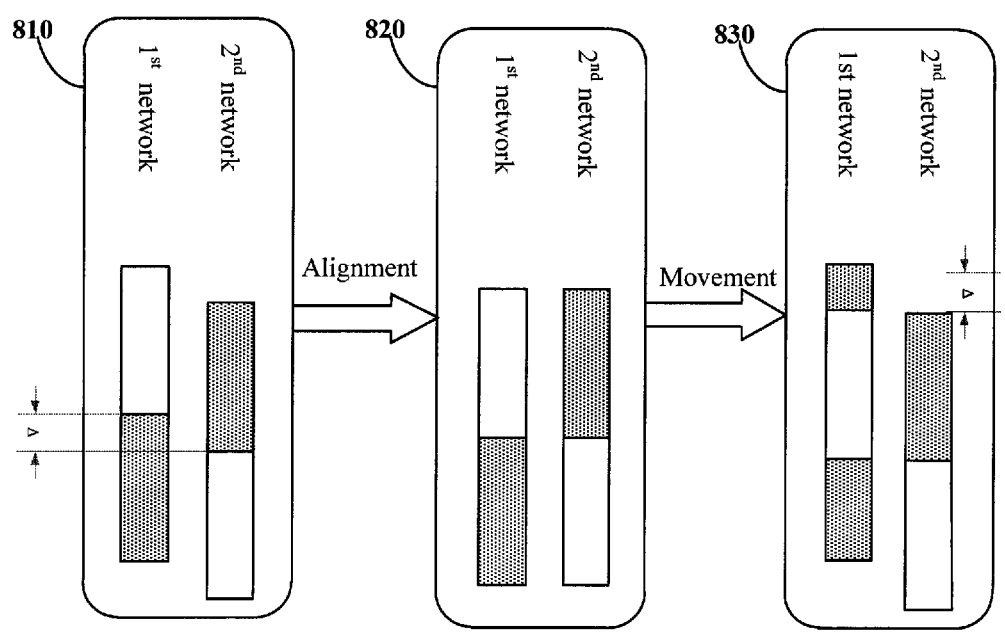
FIG. 8 illustrates an example of how to adjust a resource pattern in frequency domain according to an embodiment of the present disclosure.

FIG. 8 illustrates an example of how to adjust a resource pattern, e.g. the first resource pattern in frequency domain, according to an embodiment of the present disclosure.

As illustrated, the resource patterns in block 810 show that the first central frequency used for the first operating network is higher than the second central frequency used for the second operating network. Then in block 820, the two resource patterns are aligned. Accordingly, in block 830, the resource blocks on the lowest frequency side (i.e. at the bottom as shown) of the first resource pattern corresponding to the difference A between the first and second central frequencies are moved to the highest frequency side (i.e. the top as shown) of the first resource pattern. The patterns in block 830 will be applied to the first and second operating networks.

It shall be appreciated that the first and second resource patterns may be adjusted by the coordination node simultaneously as long as the resource blocks that are allowed to be scheduled in the adjusted resource patterns do not conflict. Further, other approaches for adjusting the resource pattern(s) may also be applicable as long as the resource blocks that are allowed to be scheduled in the resource patterns after the adjustment via these approaches do not conflict.

In an embodiment of the distributed coordination node in the first operating network, once the first and/or second resource patterns are adjusted, the distributed coordination node may notify the second operating network of the adjusted first and/or second resource patterns. If only the first resource pattern is adjusted, the distributed coordination node may or may not notify the second operating network of the adjusted first resource pattern.

In another embodiment of the centralized coordination node, once the first and/or second resource patterns are adjusted, the centralized coordination node may notify the first and second operating network of all resource patterns, including the adjusted first and/or second resource patterns. Additionally, the centralized coordination node may even notify a third operating network, which may be interfered by or interfere with any of the first and second operating networks, of the corresponding resource pattern of the interfered or interfering operating network or all the resource patterns.

Figure 9:
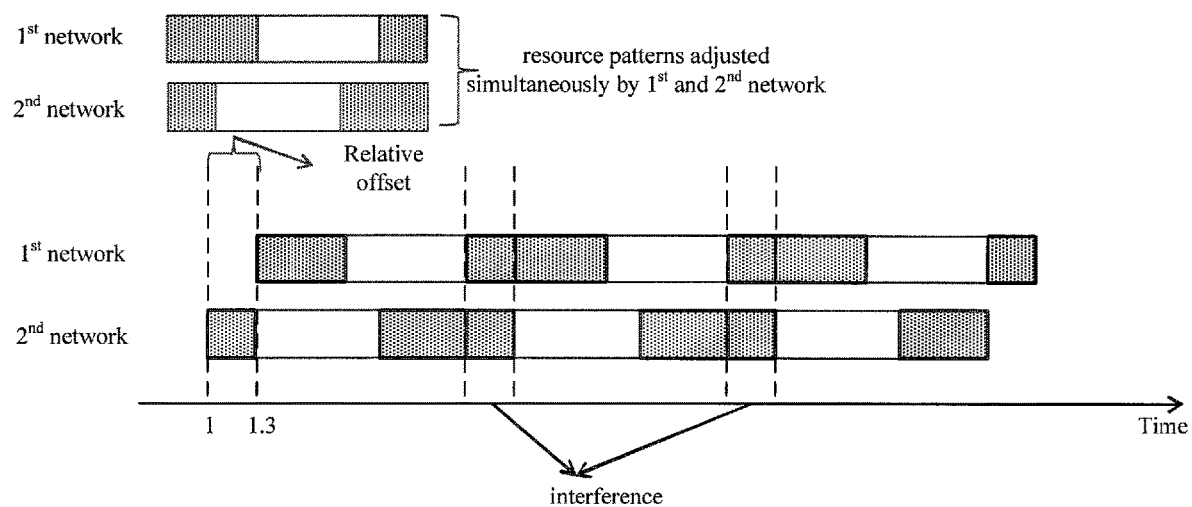
FIG. 9 illustrates a potential problem that may arise when two operating networks adjust respective resource blocks simultaneously in the distributed way.

FIG. 9 illustrates a potential problem that may arise when two operating networks adjust, in the distributed way, respective resource blocks simultaneously according to the above adjusting approaches as shown in FIG. 7, for example.

The top view of FIG. 9 shows two adjusted resource patterns. The bottom view of FIG. 9 shows the resource scheduling sequences of the first and second operating networks when the two adjusted resource patterns are adopted. Clearly, with the simultaneous adjustment, there may be some parts where schedulable resource blocks in the two networks conflict and thus severe interference may occur.

In order to solve this potential problem, the method 400 may further comprise an operation of negotiating with the second operating network at block 425 regarding which operating network will adjust the corresponding resource pattern.

In an embodiment, the negotiation may be explicitly performed. For example, if an operating network, e.g. the first operating network, will adjust its corresponding resource pattern, then it shall send a message to a peer operating network, e.g. the second operating network, to inform the resource pattern adjustment after a random backoff time. Upon receiving this informing message, the peer operating network may feedback an Acknowledgement (ACK) to confirm the resource pattern adjustment. Then the operating network having received the ACK may adjust its resource pattern and the peer operating network will not.

In another embodiment, the negotiation may be implicitly performed. As an example, it is assumed that both operating networks in the negotiation calculate positive (or negative) relative offsets first and then perform a modulo operation on the relative offsets over time duration of a resource block to obtain two normalized offsets for comparison so as to determine which operating network shall perform the adjustment. In this example, if the offset calculated by the first operating network relative to the second operating network modulo the time duration of a resource block is larger than half of the time duration of the resource block, then the first network will adjust its resource pattern. As such, the offset calculated by the second network relative to the first network modulo the time duration of the resource block is less than half of the time duration and then no adjustment of the resource pattern is performed in the second network. On the opposite, if the offset calculated by the second network relative the first network modulo the time duration of the resource block is larger than half of the time duration, then the second network will adjust its resource pattern. As such, the offset calculated by the first network relative to the second network modulo the time duration of the resource block is less than half of the time duration and then no adjustment of the resource pattern is performed in the first network. In this way, no explicit messages need to be communicated between the operating networks, which may determine whether to perform the adjustment based on the comparison of the calculated normalized offset with half of the time duration of a resource block. In an extreme case, the normalized offsets calculated by the first and second operating networks may be the same and thus the resource pattern adjustment may be given up for once time.

It shall be appreciated that other implicit negotiation methods can also be applicable as long as both operating networks can implicitly determine which one shall perform the adjustment without conflict.

It shall be understood that the principle for negotiation discussed above may be similarly applied to the case where unsynchronization occurs in frequency domain and will not be detailed herein for the sake of simplicity.

Figure 10:
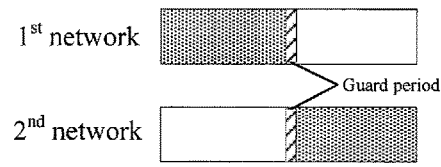
FIG. 10 illustrates a resource pattern comprising a guard period according to an embodiment of the present disclosure.

FIG. 10 illustrates a resource pattern comprising a guard period according to an embodiment of the present disclosure. In this embodiment, each of the first resource pattern and the second resource pattern may comprise a guard period for eliminating an influence of time shifting, e.g. caused by clock shifting. The guard period may be alternatively added at both ends of the schedulable resource block in each resource pattern.

Although the method 400 is described in a specific order as shown in FIG. 4, it shall be understood that some operations in the method 400 may be performed in a reverse order or in parallel without departing from the scope of the present disclosure.

Figure 11:
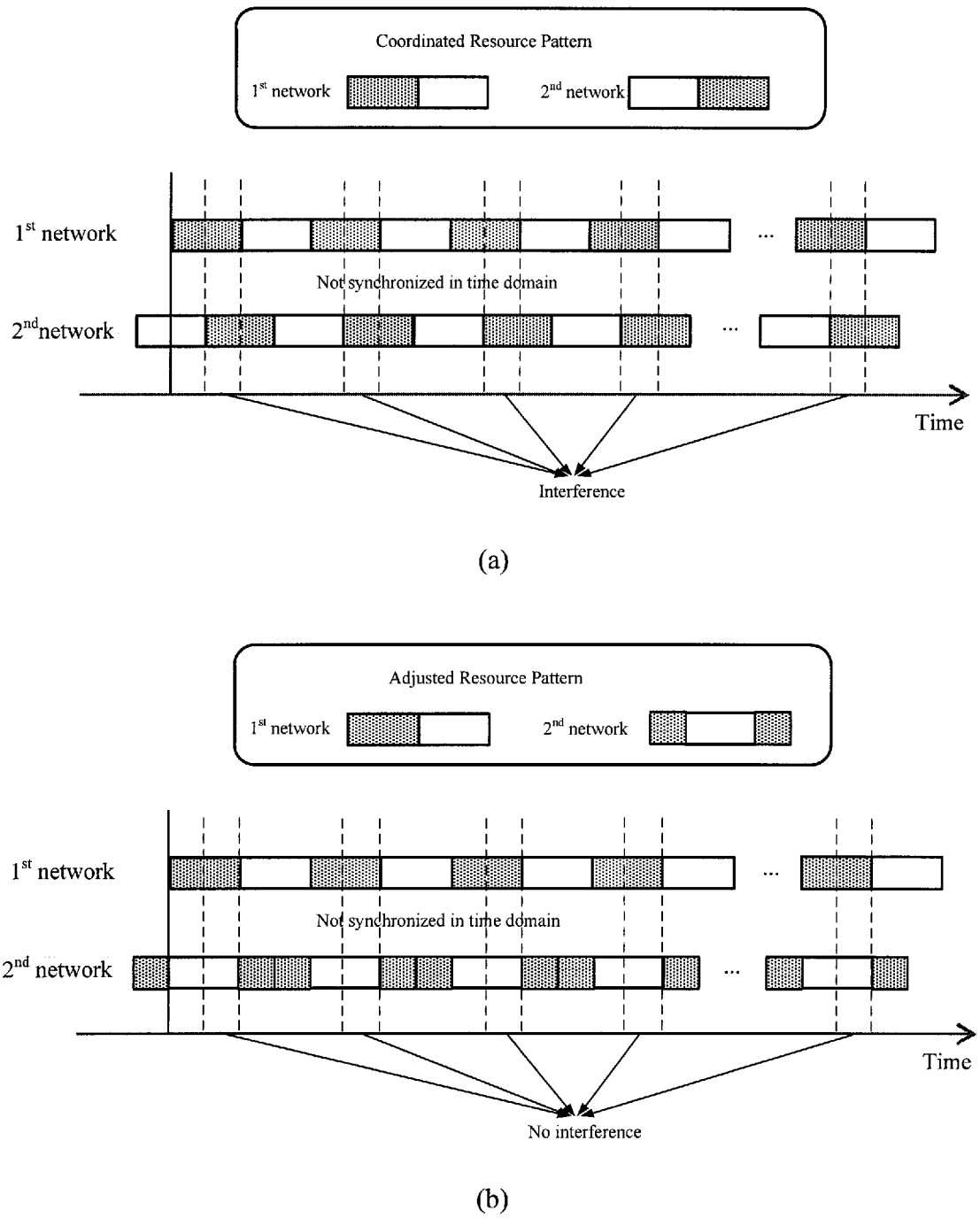
FIG. 11 illustrates a technical effect of the method in FIG. 4 when unsynchronization occurs in time domain.

FIG. 11 illustrates a technical effect of the method 400 when un-synchronization occurs in time domain.

In FIG. 11, scenario (a) where the resource patterns coordinated on the assumption that the first and second operating networks are synchronized in time domain are applied is compared with scenario (b) where the resource patterns adjusted according to the method 400 are applied. As illustrated, the interference that happens in the scenario (a) where the coordinated resource patterns are applied is eliminated in the scenario (b) where the adjusted resource patterns are applied.

Figure 12:
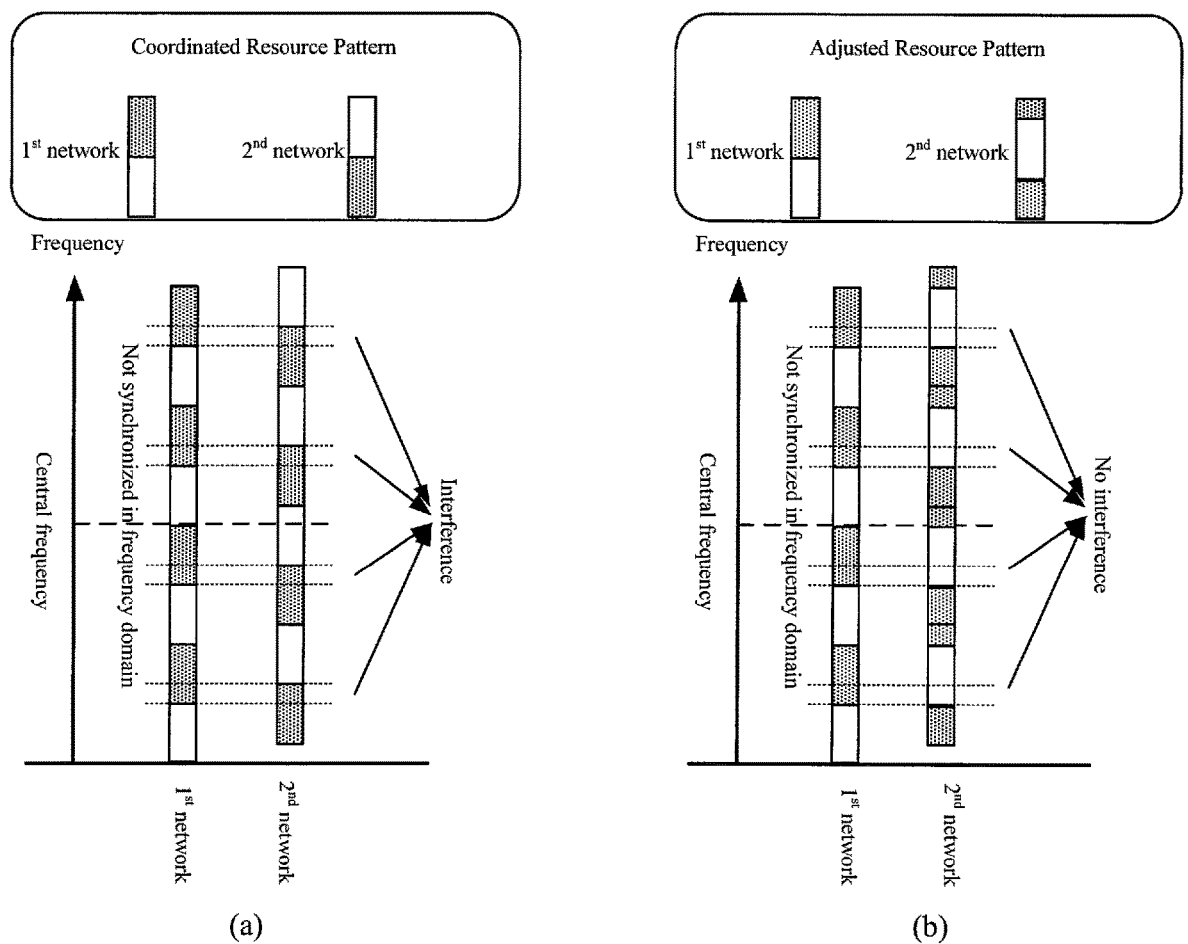
FIG. 12 illustrates a technical effect of the method in FIG. 4 when unsynchronization occurs in frequency domain.

FIG. 12 illustrates a technical effect of the method 400 when un-synchronization occurs in frequency domain.

In FIG. 12, scenario (a) where the resource patterns coordinated on the assumption that the first and second operating networks are synchronized in frequency domain are applied is compared with scenario (b) where the resource patterns adjusted according to the method 400 are applied. As illustrated, the interference that happens in the scenario (a) where the coordinated resource patterns are applied is eliminated in the scenario (b) where the adjusted resource patterns are applied.

Hereafter, the particular methods performed respectively at the base station and the terminal device in FIG. 6 will be further described with reference to FIG. 13 and FIG. 14.

Figure 13:
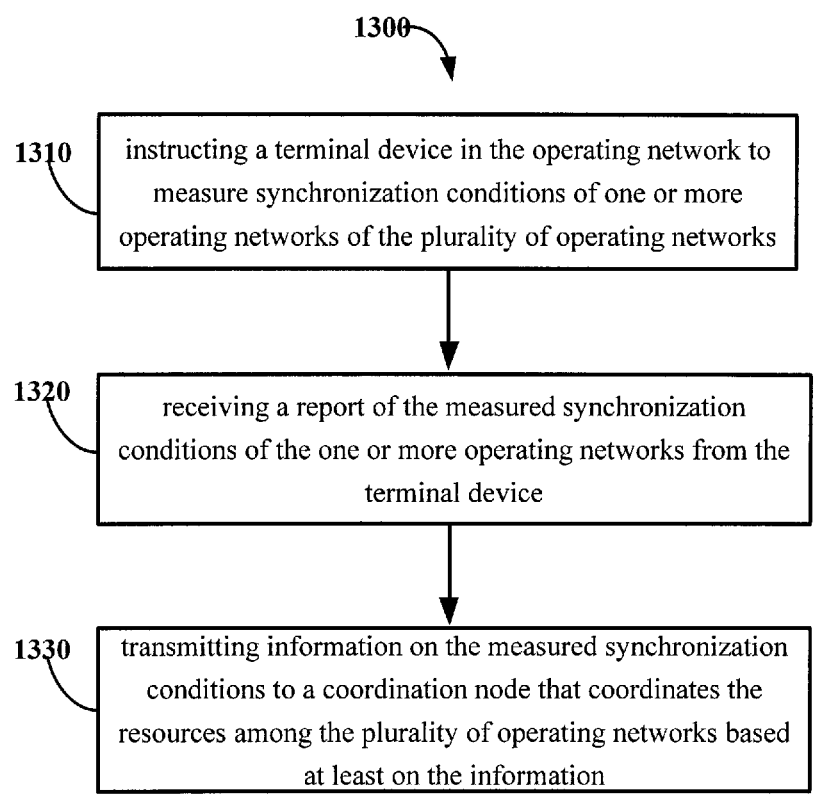
FIG. 13 illustrates a method at a base station in an operating network for facilitating coordination of resources among a plurality of operating networks including the operating network according to an embodiment of the present disclosure.

FIG. 13 illustrates a method 1300 that is performed at a base station in an operating network for facilitating coordination of resources among a plurality of operating networks including the operating network according to an embodiment of the present disclosure.

Particularly, the method 1300 is entered at block 1310, in which the base station instructs a terminal device in the operating network to measure synchronization conditions of one or more operating networks of the plurality of operating networks. In response to the instruction, the base station receives a report of the measured synchronization conditions from the terminal device at block 1320. Then at block 1330, the base station transmits information on the measured synchronization conditions to a coordination node that coordinates the resources among the plurality of operating networks based at least on the information, e.g. according to the method 400 described in reference to the embodiments of the present disclosure. The coordination node may be a distributed coordination node in the operating network or a centralized coordination node as mentioned above.

Figure 14:
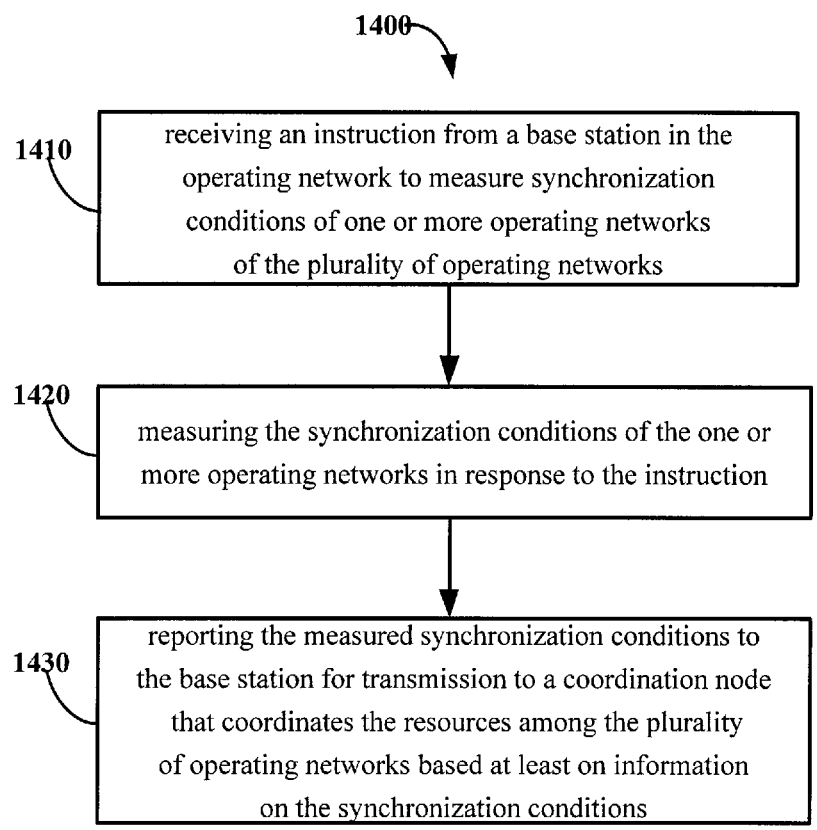
FIG. 14 illustrates a method at a terminal device in an operating network for facilitating coordination of resources among a plurality of operating networks including the operating network according to an embodiment of the present disclosure.

FIG. 14 illustrates a method 1400 that is performed at a terminal device in an operating network for facilitating coordination of resources among a plurality of operating networks including the operating network according to an embodiment of the present disclosure.

Particularly, the method 1400 is entered at block 1410, in which the terminal device receives an instruction from a base station in the operating network to measure synchronization conditions of one or more specific operating networks of the plurality of operating networks. Then in response to the instruction, the terminal device measures the synchronization conditions of the one or more operating networks at block 1420. Once the synchronization conditions are measured, the terminal device reports at block 1430 the measured synchronization conditions to the base station for transmission to a coordination node that coordinates the resources among the plurality of operating networks based at least on information on the synchronization conditions, e.g. according to the method 400 described in reference to the embodiments of the present disclosure. The coordination node may be a distributed coordination node in the operating network or a centralized coordination node as mentioned above.

Figure 15:
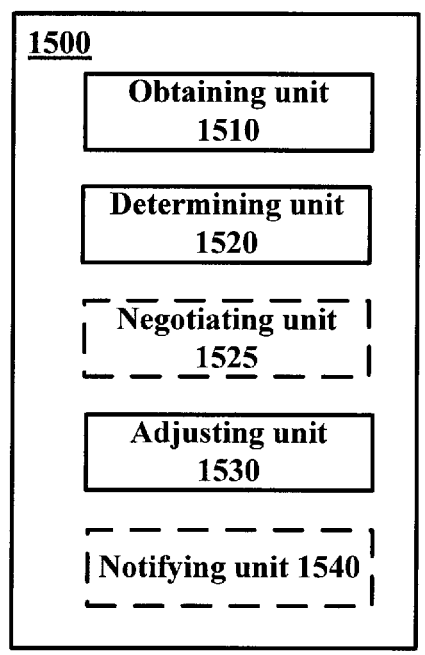
FIG. 15 illustrates a schematic block diagram of an apparatus for coordinating resources among a plurality of operating networks, including a first operating network and a second operating network.

FIG. 15 illustrates a schematic block diagram of an apparatus 1500 for coordinating resources among a plurality of operating networks, including a first operating network and a second operating network. The apparatus 1500 may be embodied at a coordination node or as at least a part thereof. The coordination node may be a distributed coordination node in the first operating network or a centralized coordination node as discussed above in relation to method 400.

Particularly, the apparatus 1500 comprises an obtaining unit 1510, a determining unit 1520, and an adjusting unit 1530.

The obtaining unit 1510 is configured to obtain a first resource pattern for the first operating network and a second resource pattern for the second operating network. The first resource pattern is coordinated with the second resource pattern such that the first and the second operating networks can conduct communications on different resource blocks when the first operating network is synchronized with the second operating network. The determining unit 1520 is configured to determine whether the first operating network is synchronized with the second operating network. The adjusting unit 1530 is configured to adjust at least the first resource pattern such that the first and the second operating networks can conduct communications on different resource blocks, if the first operating network is not synchronized with the second operating network.

In an embodiment that the apparatus is embodied at the distributed coordination node, the apparatus 1500 may further comprise a notifying unit 1540 that is configured to notify the second operating network of at least the adjusted first resource pattern.

In another embodiment that the apparatus embodied at the distributed coordination node, the apparatus may further comprise a negotiating unit 1525 that is configured to negotiate with the second operating network regarding which operating network will adjust the corresponding resource pattern.

In yet another embodiment that the apparatus is embodied at the centralized coordination node, the apparatus 1500 may further comprise a notifying unit 1540 that is configured to notify at least the first operating network and the second operating network of at least the adjusted first resource pattern. In such embodiment, the plurality of operating networks may be communicatively connected to the centralized coordination node.

In yet another embodiment, the determining unit 1520 may be configured to determine whether the first operating network is synchronized with the second operating network by calculating at least one offset for the first operating network and the second operating network based on a measurement report from a terminal device in the first operating network and/or a terminal device in the second operating network.

In yet another embodiment, the adjusting unit 1530 may be configured to, if the at least one offset indicates that first timing of the first operating network is later than second timing of the second operating network, then move resource blocks on the earliest side of the first resource pattern corresponding to a time difference between the first timing and the second timing to the latest side of the first resource pattern. In such an embodiment, the adjusting unit 1530 may be further configured to, if the at least one offset indicates that the first timing is earlier than the second timing, then move the resource blocks on the latest side of the first resource pattern corresponding to the time difference between the first timing and the second timing to the earliest side of the first resource pattern.

In yet another embodiment, the adjusting unit 1530 may be configured to, if the at least one offset indicates that a first central frequency used for the first operating network is lower than a second central frequency used for the second operating network, then move resource blocks on the highest frequency side of the first resource pattern corresponding to a frequency difference between the first central frequency and the second central frequency to the lowest frequency side of the first resource pattern. In such embodiment, the adjusting unit 1530 may be further configured to, if the at least one offset indicates that the first central frequency is higher than the second central frequency, then move resource blocks on the lowest frequency side of the first resource pattern corresponding to a frequency difference between the first central frequency and the second central frequency to the highest frequency side of the first resource pattern.

In a further embodiment, the first resource pattern and the second resource pattern may comprise a guard period for eliminating an influence of time shifting.

The above units 1510-1540 may be configured to implement the corresponding operations or steps as described above in relation to the method 400 and thus will not be detailed herein for the sake of brevity.

Figure 16:
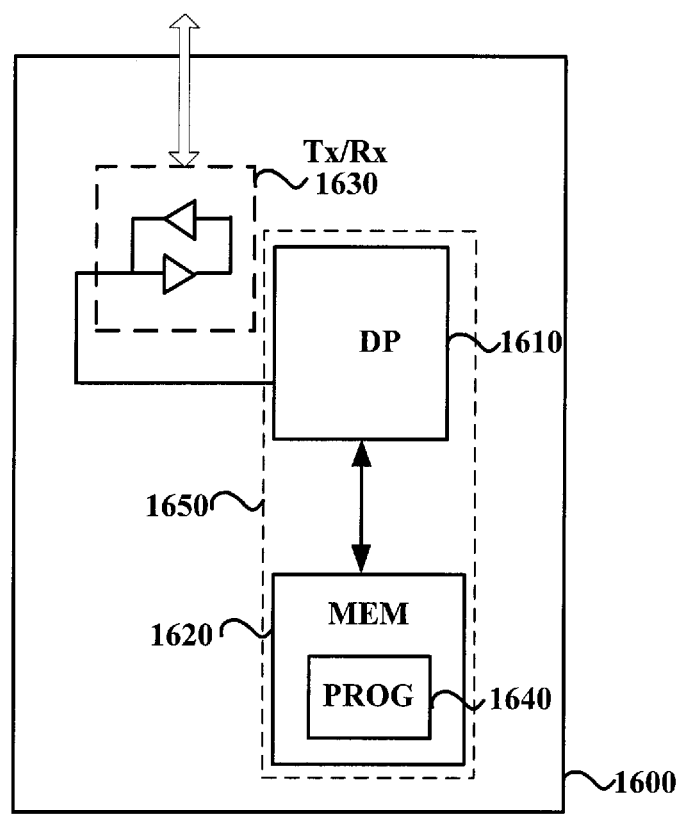
FIG. 16 illustrates a simplified block diagram of an apparatus according to embodiments of the present disclosure.

FIG. 16 illustrates a simplified block diagram of an apparatus 1600. The apparatus 1600 may be embodied at or as at least part of a coordination node for coordinating resources among a plurality of operating networks according to some embodiments of the present disclosure. The apparatus 1600 may alternatively be embodied at or as at least a part of a base station in an operating network for facilitating coordination of resources among a plurality of operating networks including the operating network according to some embodiments of the present disclosure. The apparatus 1600 may alternatively be embodied at or as at least of a terminal device in an operating network for facilitating coordination of resources among a plurality of operating networks including the operating network according to some other embodiments of the present disclosure.

Particularly, the apparatus 1600 comprises at least one processor 1610, such as a data processor (DP) and at least one memory (MEM) 1620 coupled to the processor 1610. The apparatus 1600 may further comprise a transmitter TX and receiver RX 1630 coupled to the processor 1610 for establishing communications with other apparatuses. The MEM 1620 stores a program (PROG) 1640. The PROG 1640 may include instructions that, when executed on the associated processor 1610, enable the apparatus 1600 to operate in accordance with the embodiments of the present disclosure, for example to perform the method 400, 1300 or 1400, depending on the specific implementation of the apparatus 1600. A combination of the at least one processor 1610 and the at least one MEM 1620 may form processing means 1650 that is adapted to implement some embodiments of the present disclosure.

The MEM 1620 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1610 may be of any type suitable to the local technical environment, and may include one or more of general purpose computers, special purpose computers, microprocessors, digital signal processors (DSPs) and processors based on multicore processor architecture, as non-limiting examples.

Further, the present disclosure may also provide a computer program product comprising instructions that when executed by a processing unit in a coordination node, base station or terminal device causes the coordination node, base station or terminal device to perform the method 400, 1300 or 1400, respectively.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method, at a coordination node, for coordinating resources among a plurality of operating networks including a first operating network and a second operating network, the method comprising:
    obtaining a first resource pattern for the first operating network and a second resource pattern for the second operating network, the first resource pattern being coordinated with the second resource pattern such that the first operating network and the second operating network conduct communications on different resource blocks when the first operating network is synchronized with the second operating network;
    determining whether the first operating network is synchronized with the second operating network, wherein determining whether the first operating network is synchronized with the second operating network comprises calculating at least one offset for the first operating network and the second operating network based on a measurement report from a terminal device in the first operating network and/or a measurement report from a terminal device in the second operating network; and
    adjusting at least the first resource pattern such that the first operating network and the second operating network conduct communications on different resource blocks when it is determined that the first operating network is not synchronized with the second operating network, wherein adjusting at least the first resource pattern comprises:
        when the at least one offset indicates that first timing of the first operating network is later than second timing of the second operating network, moving resource blocks on the earliest side of the first resource pattern corresponding to a time difference between the first timing and the second timing to the latest side of the first resource pattern; and
        when the at least one offset indicates that the first timing is earlier than the second timing, moving the resource blocks on the latest side of the first resource pattern corresponding to the time difference between the first timing and the second timing to the earliest side of the first resource pattern.

2. The method according to claim 1, further comprising: notifying the second operating network of at least the adjusted first resource pattern.

3. The method according to claim 1, further comprising: negotiating with the second operating network regarding which operating network will adjust the corresponding resource pattern.

4. The method according to claim 1, further comprising: notifying at least the first operating network and the second operating network of at least the adjusted first resource pattern, wherein the plurality of operating networks is communicatively connected to the coordination node.

5. The method according to claim 1, wherein the first resource pattern and the second resource pattern comprise a guard period for eliminating an influence of time shifting.

6. An apparatus, at a coordination node, for coordinating resources among a plurality of operating networks, the apparatus comprising a processor and memory, said memory containing instructions executable by said processor, whereby said apparatus is operative to perform the method of claim 1.

7. An apparatus, at a coordination node, for coordinating resources among a plurality of operating networks, the apparatus comprising a processor adapted to perform the method of claim 1.

8. A non-transitory computer program product comprising instructions that, when executed by a processing unit in a coordination node, cause the coordination node to perform the method of claim 1.

9. An apparatus, at a coordination node, for coordinating resources among a plurality of operating networks including a first operating network and a second operating network, the apparatus comprising:
    an obtaining unit configured to obtain a first resource pattern for the first operating network and a second resource pattern for the second operating network, the first resource pattern being coordinated with the second resource pattern such that the first operating network and the second operating network conduct communications on different resource blocks when the first operating network is synchronized with the second operating network;
    a determining unit configured to determine whether the first operating network is synchronized with the second operating network, wherein the determining unit is configured to determine whether the first operating network is synchronized with the second operating network by calculating at least one offset for the first operating network and the second operating network based on a measurement report from a terminal device in the first operating network and/or a measurement report from a terminal device in the second operating network; and
    an adjusting unit configured to adjust at least the first resource pattern such that the first operating network and the second operating network conduct communications on different resource blocks when it is determined by the determining unit that the first operating network is not synchronized with the second operating network, wherein the adjusting unit is further configured to:
- when the at least one offset indicates that first timing of the first operating network is later than second timing of the second operating network, move resource blocks on the earliest side of the first resource pattern corresponding to a time difference between the first timing and the second timing to the latest side of the first resource pattern; and
- when the at least one offset indicates that the first timing is earlier than the second timing, move the resource blocks on the latest side of the first resource pattern corresponding to the time difference between the first timing and the second timing to the earliest side of the first resource pattern.

10. The apparatus according to claim 9, further comprising:
- a notifying unit configured to notify the second operating network of at least the adjusted first resource pattern.

11. The apparatus according to claim 9, further comprising:
- a negotiating unit configured to negotiate with the second operating network regarding which operating network will adjust the corresponding resource pattern.

12. The apparatus according to claim 9, further comprising:
- a notifying unit configured to notify at least the first operating network and the second operating network of at least the adjusted first resource pattern, wherein the plurality of operating networks is communicatively connected to the coordination node.

13. The apparatus according to claim 9, wherein the first resource pattern and the second resource pattern comprise a guard period for eliminating an influence of time shifting.

14. A method, at a base station in a first operating network, for facilitating coordination of resources among a plurality of operating networks including the first operating network and a second operating network, the method comprising:
- instructing a terminal device in the first operating network to measure synchronization conditions of one or more operating networks of the plurality of operating networks, wherein the synchronization conditions comprise at least a synchronization clock of the one or more operating networks;
- receiving a report of the measured synchronization conditions of the one or more operating networks from the terminal device; and
- transmitting information on the measured synchronization conditions to a coordination node that coordinates the resources among the plurality of operating networks based at least on the information, wherein the coordination node determines whether the first operating network is synchronized with the second operating network by calculating at least one offset for the first operating network and the second operating network based on the information on the measured synchronization conditions, and wherein when it is determined that the first operating network is not synchronized with the second operating network, the coordination node adjusts at least a first resource pattern for the first operating network by:
  - moving resource blocks on the earliest side of the first resource pattern corresponding to a time difference between first timing of the first operating network and second timing of the second operating network to the latest side of the first resource pattern, when the at least one offset indicates that the first timing is later than the second timing, and
  - moving the resource blocks on the latest side of the first resource pattern corresponding to the time difference between the first timing and the second timing to the earliest side of the first resource pattern, when the at least one offset indicates that the first timing is earlier than the second timing.

15. A method, at a terminal device in a first operating network, for facilitating coordination of resources among a plurality of operating networks including the first operating network and a second operating network, the method comprising:
- receiving an instruction from a base station in the first operating network to measure synchronization conditions of one or more operating networks of the plurality of operating networks, wherein the synchronization conditions comprise at least a synchronization clock of the one or more operating networks;
- measuring the synchronization conditions of the one or more operating networks in response to the instruction; and
- reporting the measured synchronization conditions to the base station for transmission to a coordination node that coordinates the resources among the plurality of operating networks based at least on information on the measured synchronization conditions, wherein the coordination node determines whether the first operating network is synchronized with the second operating network by calculating at least one offset for the first operating network and the second operating network based on the information on the measured synchronization conditions, and wherein when it is determined that the first operating network is not synchronized with the second operating network, the coordination node adjusts at least a first resource pattern for the first operating network by:
  - moving resource blocks on the earliest side of the first resource pattern corresponding to a time difference between first timing of the first operating network and second timing of the second operating network to the latest side of the first resource pattern, when the at least one offset indicates that the first timing is later than the second timing, and
  - moving the resource blocks on the latest side of the first resource pattern corresponding to the time difference between the first timing and the second timing to the earliest side of the first resource pattern, when the at least one offset indicates that the first timing is earlier than the second timing.

* * * * *